United States Patent [19]

Coriden

[11] 4,113,212
[45] Sep. 12, 1978

[54] COLLAPSIBLE ELECTRONIC CALCULATOR STAND

[76] Inventor: Paul Coriden, 5501 W. Irving Park Rd., Chicago, Ill. 60641

[21] Appl. No.: 804,782

[22] Filed: Jun. 8, 1977

[51] Int. Cl.² .............................................. F16F 15/00
[52] U.S. Cl. ..................................... 248/13; 248/455; 248/460
[58] Field of Search ................. 248/454, 455, 456, 13, 248/19, 460, 472, 469, 359

[56] References Cited

U.S. PATENT DOCUMENTS

| | | | |
|---|---|---|---|
| 1,002,147 | 8/1911 | Harris | 248/455 |
| 1,278,619 | 9/1918 | Fant | 248/455 |
| 2,872,046 | 2/1959 | Polay | 211/42 |
| 3,178,138 | 4/1965 | Hessdoerfer et al. | 248/205 A |

FOREIGN PATENT DOCUMENTS 3,097 of 1901 United Kingdom ..................... 248/472

*Primary Examiner*—Robert A. Hafer
*Attorney, Agent, or Firm*—Hume, Clement, Brinks, Willian & Olds, Ltd.

[57] ABSTRACT

A collapsible calculator stand for pocket size electronic calculators to raise the calculator's visual display and keyboard to a better visual angle for desk use. The stand has a base adapted for attachment to the back of a calculator and a leg pivotably mounted to the base. The leg has a grooved end, an integral stop and a non-skid foot. Lateral walls having studs cooperate with the leg to help lock the collapsible stand into its proper open and collapsed positions, due to the need to flex the leg and the walls to move the leg between its open and collapsed positions. The collapsible stand is sold with a separate self-adhesive foot, adapted for attachment to the bottom edge of the calculator, which helps eliminate any tendency of the calculator to creep during use.

6 Claims, 6 Drawing Figures

COLLAPSIBLE ELECTRONIC CALCULATOR STAND

BACKGROUND OF THE INVENTION

This invention relates to a collapsible stand for small electronic calculators, which elevates the keyboard and visual display of the calculator to the correct visual angle for desk use.

Millions of small, pocket size, electronic calculators have been sold within the past few years. These pocket size calculators are normally intended for both hand held and desk use. However, the keyboards and visual displays of many calculator models are aligned so that they cannot be conveniently read when used on a desk or similar flat surface. Thus, there is a need for a device which may be attached to a calculator to elevate the keyboard and the display to a better visual angle for use on a flat surface, and which will be so unobtrusive that it will not interfere with hand use, or storage in a pocket or the case supplied by the calculator manufacturer.

SUMMARY OF THE INVENTION

This invention relates to a collapsible support stand for small electronic calculators, commonly known as pocket size calculators, which may be permanently attached to the calculator to elevate the keyboard and especially the visual display to a better visual angle for use on a desk or other flat surface, and which will not interfere with hand held usage of the calculator or storage. The calculator stands of the invention are provided with a base having a means for affixing the stand to the back of a calculator, a leg provided with a non-skid foot for resting on the desk or other surface, and with a coupling means for pivotably mounting the leg to the base for movement of the leg between an open position and a collapsed position. In the open position, the leg and the stand support the calculator at an advantageous visual angle. In the collapsed position, the leg folds against the calculator, and the calculator may be easily inserted into a pocket or the storage case supplied with the calculator.

This invention also relates to a unique calculator stand kit which includes the collapsible calculator stand and a non-skid self adhesive foot adapted for attachment to the lower rear edge of the calculator, which helps prevent the creep frequently encountered when the calculator stand is employed alone.

Most advantageously, the calculator stand of the invention is made of resilient plastic and the base and the leg cooperate to lock the leg into its proper positions. In this most advantageous embodiment, the end of the leg coupled to the base is provided with longitudinal grooves which divide the end into segments, and the outer segments are each provided with an outwardly extending pin. The base is provided with two parallel, spaced apart, lateral walls which are each provided with an opening, aligned to receive one of the pins, and with an inwardly projecting stud. The studs are positioned on the inner surface of the walls between the open and collapsed positions of the leg, and so that the distance between the studs is less than the width of the pin end of the leg. As a result, the stud and walls flex outwardly and the pin end of the leg flexes inwardly as the leg passes over the studs, when the leg is between its open and collapsed positions. This structural arrangement and the flexing action of the base and leg help lock the leg into its proper positions and tend to prevent the leg from inadvertently collapsing or opening. In the most advantageous embodiment, the leg is provided with a stop which rests against the base to support the leg in its open position. The base also is provided with a reinforcing rib affixed to the walls which helps reduce the flex of the walls and which improves the leg locking characteristics of the calculator stand.

The principal advantage of the invention is the availability of an inexpensive, collapsible, electronic calculator support stand which may be readily mounted to a pocket size calculator to elevate the visual display and keyboard to a better visual angle for desk use, without the need for any tools. Another advantage of the invention is the fact that the stand folds flat to fit into a pocket or calculator case. In addition, the calculator stands of the invention possess a self locking feature that locks the leg into the position desired, and they are provided with non-skid feet which tend to reduce calculator movement or creep during use. Moreover, the calculator stands of the invention are adaptable for use with virtually every available type of pocket size calculator, an advantage which is enhanced by the unique calculator stand kit of the invention which further minimizes the creep tendency encountered with many calculators.

Additional features and advantages of the invention are described in, and will appear from, the description of the preferred embodiments which follow and from the accompanying drawing.

DESCRIPTION OF THE PREFERRED EMBODIMENTS

Figure 1:
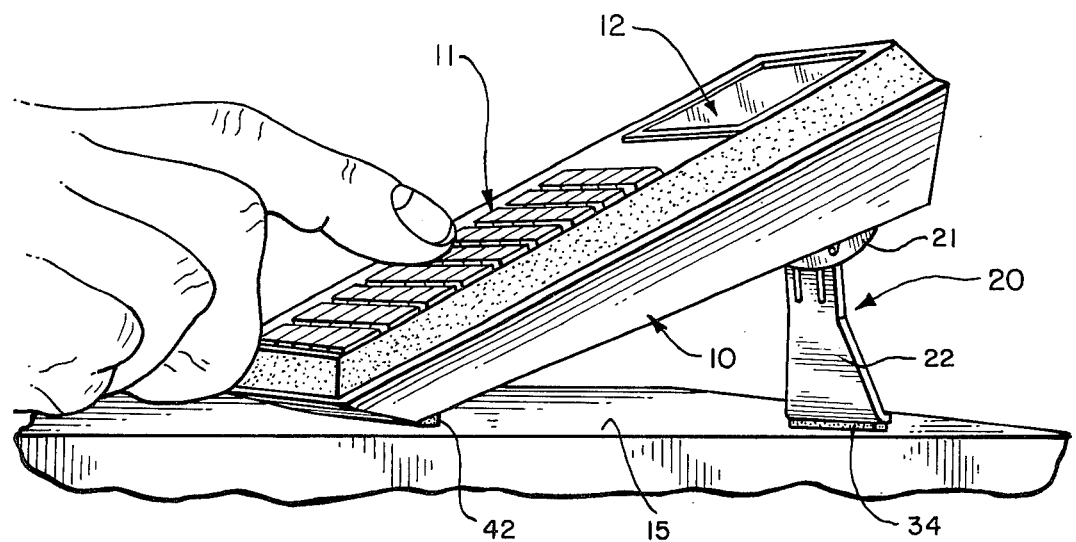
FIG. 1 is a perspective view of a small, so-called pocket size, electronic calculator having a preferred embodiment of the collapsible stand of the invention mounted on its rear, illustrating the manner in which the calculator stand elevates the calculator display for easier reading.
Figure 2:
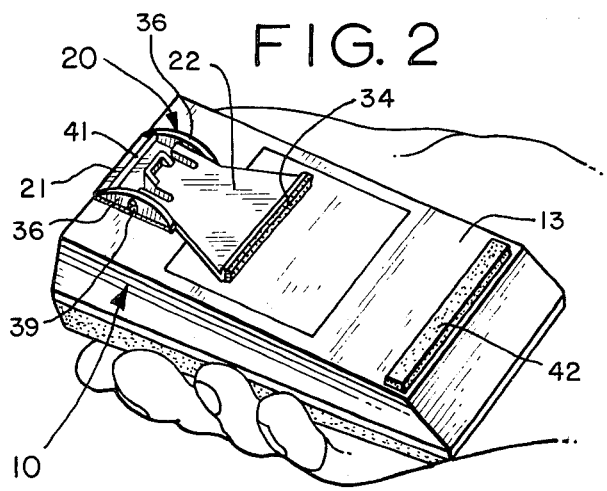
FIG. 2 is another perspective view of the pocket size calculator of FIG. 1 illustrating the preferred location of the calculator stand, at the upper rear end of the calculator, and also illustrating the collapsed position of the calculator stand and the separate non-skid rubber foot mounted at the lower rear end of the calculator.

This invention is particularly adapted for attachment to small, so-called pocket size, electronic calculators. Such a calculator is illustrated in FIGS. 1 and 2 by reference numeral 10. Such calculators are provided with a keyboard 11 and a visual display 12.

FIGS. 1 and 2 also illustrate a preferred embodiment of the collapsible calculator stand of the invention, which is generally indicated by reference numeral 20. Calculator stand 20 is provided with a base 21, which is adapted for attachment to the back 13 of calculator 10, and with a leg 22 which is pivotably mounted to base 21. When the calculator stands 20 of the invention are mounted on the back of a calculator 10, they elevate the visual display 12 and the keyboard 11 to a better visual angle for desk use.

Figure 3:
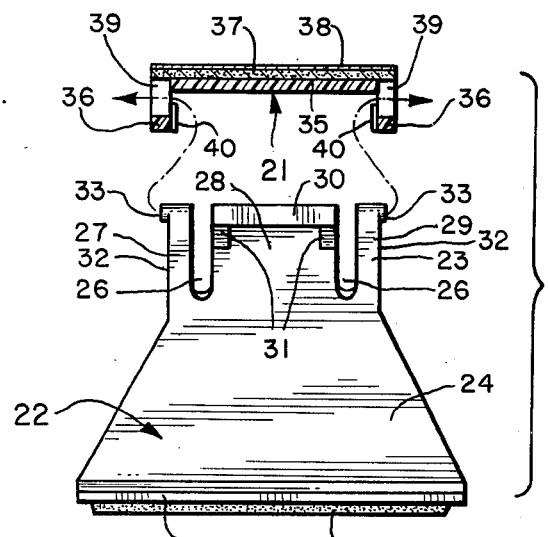
FIG. 3 is an enlarged exploded view, in partial cross-section, of the base and leg of the calculator stand shown in FIG. 1.
Figure 4:
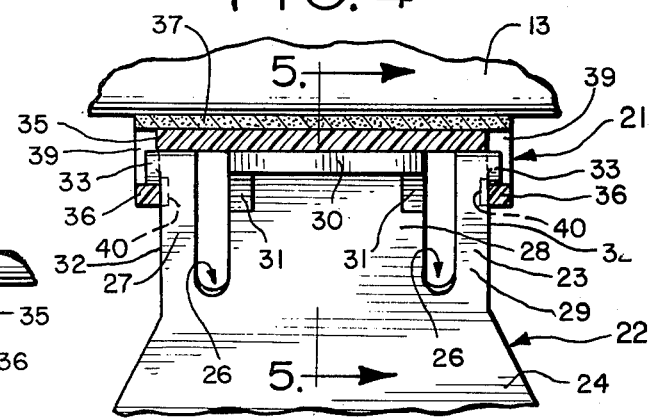
FIG. 4 is an enlarged view, in partial cross-section, illustrating the manner in which the leg is mounted on the base.

Referring now to FIGS. 3 and 4, leg 22 is provided with a forked end 23, and an outwardly tapering body 24, both of which are formed in the same plane, and with an offset foot 25.

Figure 5:
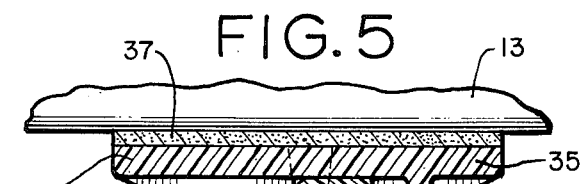
FIG. 5 is an enlarged cross-sectional view taken along line 5—5 in FIG. 4, showing the leg in its open position.
Figure 6:
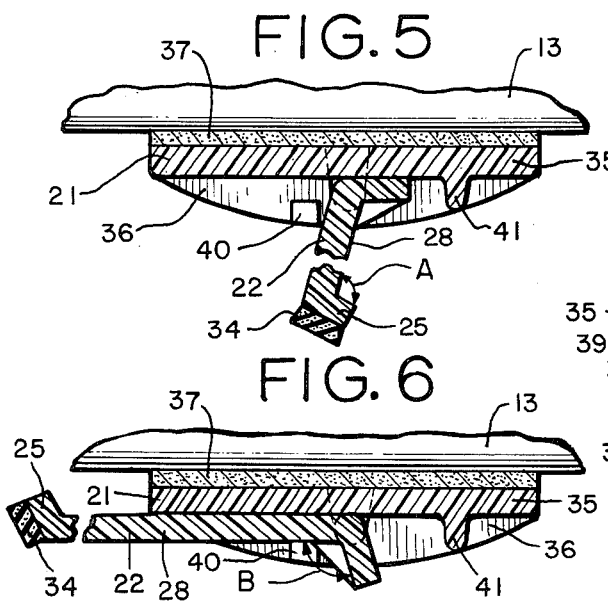
FIG. 6 is an enlarged cross-sectional view, similar to FIG. 5, showing the leg in its collapsed position.

Forked end 23 is provided with two deep grooves 26 which divide end 23 into three arms 27, 28, 29. The outer edges 32 of outer arms 27, 29 are parallel. Outer arms 27, 29 are both provided with an outwardly projecting pin 33. Center arm 28 is provided with a stop 30 which rests against base 21 when leg 22 is in its open position (see FIGS. 4 and 5). Stop 30 is provided with tapered reinforcing ribs 31. Stop 30 is advantageously offset between about 100° and 120° from the plane of leg body 24 and forked end 23. In the embodiment illustrated, the angle of offset is about 105°; see angle B in FIG. 6.

Base 21 is provided with a flat base member 35 and with two, parallel, spaced apart, lateral walls 36. The bottom of base member 35 is provided with a foamed, adhesive containing layer 37, covered by protective layer 38, by which base 21 and calculator stand 20 may be permanently mounted to the back 13 of the calculator.

Walls 36 are each provided with an opening 39 aligned with each other and pins 33 so that one of pins 33 is disposed in the opening to effect the pivotal mounting of leg 22 to base 21. Walls 36 are each provided with an inwardly projecting stud 40. Studs 40 are positioned forward of openings 39 and above base member 35 so that leg 22 essentially stands clear of studs 40 when it is in either its open or its collapsed positions (see FIGS. 5 and 6). The distance between studs 40 is less than the distance between outer edges 32 of outer arms 27, 29. When leg 22 moves between its open and collapsed positions, walls 36, on which studs 40 are positioned, and outer arms 27, 29 of leg 22 must flex (the walls 36 outwardly and arms 27, 29 inwardly) in order for the leg to pass. As a result, walls 36, studs 40 and outer leg arms 27, 29 cooperate to help lock leg 22 into either its open or its collapsed position, as chosen by the calculator user, and to help prevent inadvertent opening or collapse of the leg. A reinforcing rib 41 or equivalent means may be provided to strengthen lateral walls 36. This reduces the flexibility of the walls and improves the leg locking characteristics of the calculator stand.

The leg and base of the calculator stand of the invention are most advantageously formed from resilient plastic. DELRIN, an acetal resin, produced by E. I. duPont de Nemours & Co., Inc. is a preferred plastic, although other plastics, such as nylon, may be employed.

The proper mounting position for the calculator stand of the invention is on the upper center back of the calculator. The correct position, for any given calculator, will vary from the extreme top edge to approximately one-third of the way down, depending on the length of the calculator. The stand 20 is mounted on the calculator by removing protective layer 38 and firmly pressing adhesive layer 37 against the back of the calculator, at the determined proper location.

When the calculator stand of the invention is used in conjunction with many calculators, the non-skid foot 34 at the end of leg 22 is sufficient to prevent the tendency of the calculator to creep when in use. However, for those calculators which still tend to creep, the calculator stand of the invention is sold as a kit which includes a separate, rectangular, non-skid, foam rubber foot 42. This foam rubber foot is provided with an adhesive layer on one side, protected by a backing, for permanent adhesive mounting to the back lower edge of the calculator, where it comes in contact with the desk when the leg is in its open position. The use of this separate, non-skid foot 42, in conjunction with stand 20, substantially eliminates any creeping tendency of the calculator.

The embodiments described herein are intended to be exemplary of the types of calculator stands which come within the scope of the invention. However, one skilled in the art would certainly be expected to be able to make modifications and variations of these preferred embodiments without departing from the spirt and scope of the invention, as it is defined in the following claims.

I claim:

1. A collapsible stand for small electronic calculators, comprising:

a base, and a leg pivotably mounted to the base for movement between an open position, for supporting the calculator at an angle, and a collapsed position, the base and the leg formed from plastic;

the base including a flat base member and two parallel, spaced apart, walls extending upward from the base member, the bottom of the base member having an adhesive containing layer for fastening the base to the back of a calculator;

the leg having a non-skid foot at one end offset with respect to the longitudinal plane of the leg, for resting on a surface when the leg is in its open position, the opposite end of the leg having a pair of outwardly extending pins, the leg's pin end formed into a center and two outer arm members separated from one another by grooves, each of the outer arm members carrying a pin, the center arm member having a stop for resting against the base member and supporting the leg when the leg is in its open position;

each of the walls having an opening in which one of the pins is disposed and having an inwardly projecting stud for cooperating with the leg to lock the leg into position, the distance between th studs being less than the distance between the outer edges of the leg's two outer arm members;

the non-skid foot and the stop being offset between 100° and 120° from the plane of the leg;

whereby the walls flex outwardly and the outer arm members of the leg flex inwardly as the leg passes over the studs, as the leg moves between its open and collapsed positions.

2. The calculator stand of claim 1, wherein the non-skid foot is rubber.

3. The calculator stand of claim 1, wherein the foot end of the leg is substantially wider than the pin end.

4. The calculator stand of claim 1, wherein the base member includes a means for reducing the flex of the walls.

5. The calculator stand of claim 1, wherein the foot and the stop are both offset approximately 105° with respect to the plane of the leg.

6. An electronic calculator stand kit comprising the calculator stand of claim 1 and a non-skid, self adhesive pad for the lower rear edge of the calculator.

* * * * *